Nov. 7, 1933.　　　　　L. GORDON　　　　　1,933,623
CONVERTIBLE VEHICLE BODY
Filed March 30, 1931　　2 Sheets-Sheet 1
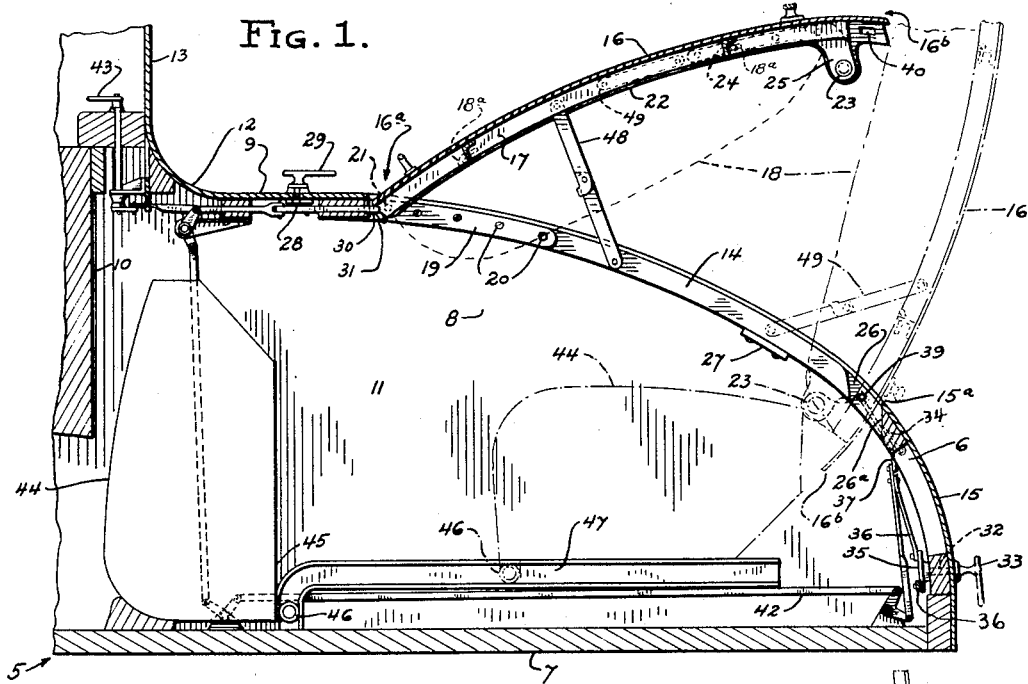
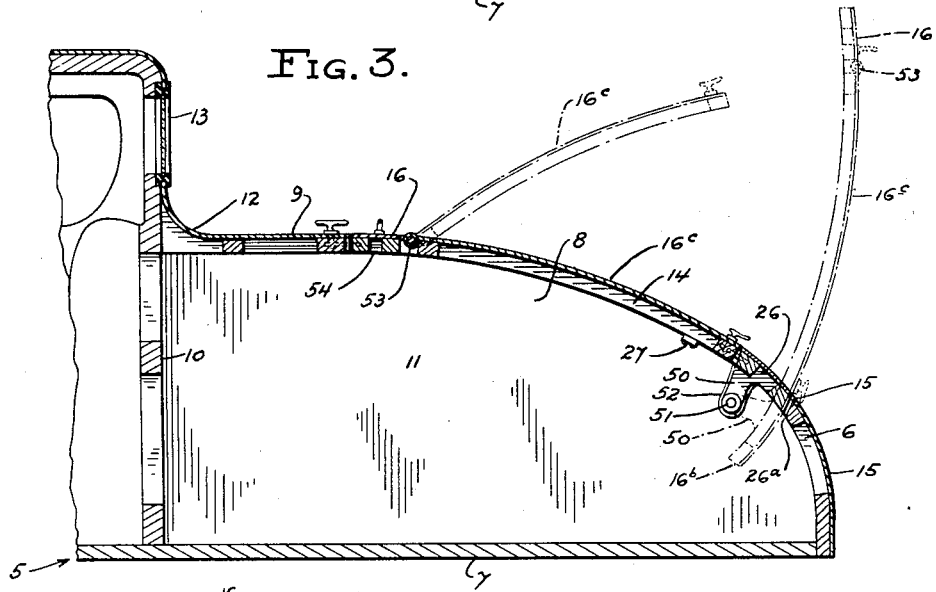
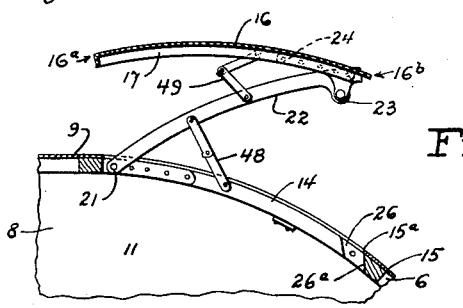
INVENTOR.
Lincoln Gordon.
BY
ATTORNEY.

Nov. 7, 1933.  L. GORDON  1,933,623

CONVERTIBLE VEHICLE BODY

Filed March 30, 1931  2 Sheets-Sheet 2

INVENTOR.
Lincoln Gordon.
BY
ATTORNEY.

Patented Nov. 7, 1933

1,933,623

UNITED STATES PATENT OFFICE 1,933,623

CONVERTIBLE VEHICLE BODY

Lincoln Gordon, Oakland, Calif., assignor to Jules H. Bernheim and S. L. Fendel, both of San Francisco, Calif., trustees for Lincoln Gordon, E. C. Bridgman, Jr., Jules H. Bernheim, and S. L. Fendel Application March 30, 1931. Serial No. 526,174

3 Claims. (Cl. 296—76)

This invention relates to convertible bodies for vehicles, and particularly to bodies of motor driven vehicles of the types having a driver's seat forwardly of the vehicle frame or chassis and a rearward portion of the chassis covered by a deck between which and the frame is a compartment.

This model of body is adapted to automobiles of the type which are termed coupés or business bodies and roadsters. Heretofore, it has been well known to provide an opening in the top of such rear compartment and to provide a cover overlying the opening, hinged adjacent the back of the driver's seat; likewise it has been well known to provide a hinge for said cover adjacent the rear portion of the vehicle body, and to provide a cushioned back to the inner face of said cover, and provide a seat within the rear compartment of the body which is commonly termed a rumble seat.

Both types of vehicle bodies above described have advantages, the former providing a storage space easy of access from the rear of the vehicle, the latter providing an additional seat to the vehicle which normally is covered and closed within the rear compartment, but is easily accessible when desired for extra passenger accommodation.

The objects of this invention are to provide in the rear portion of a vehicle body a combined rumble seat and storage compartment; to provide means whereby such a rear compartment may be utilized for either purpose without change of form or structure; to provide means whereby the cover portion of such a compartment may be secured to the vehicle body so that it may be opened either forwardly or rearwardly; to provide means to fixedly position one end of such deck portion when the other end is open, and to generally improve upon the known types of vehicle bodies.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 1 is a vertical longitudinal section of rearward portion of a vehicle body in storage compartment formation, showing in dotted lines the rumble seat transformation.

Figs. 3, 4 and 5 are vertical longitudinal sections of rearward portion of vehicle body, showing modified forms of the invention.

Fig. 6 is a vertical longitudinal section of part of body showing relationship of hinge to body and cover.

Figure 2:
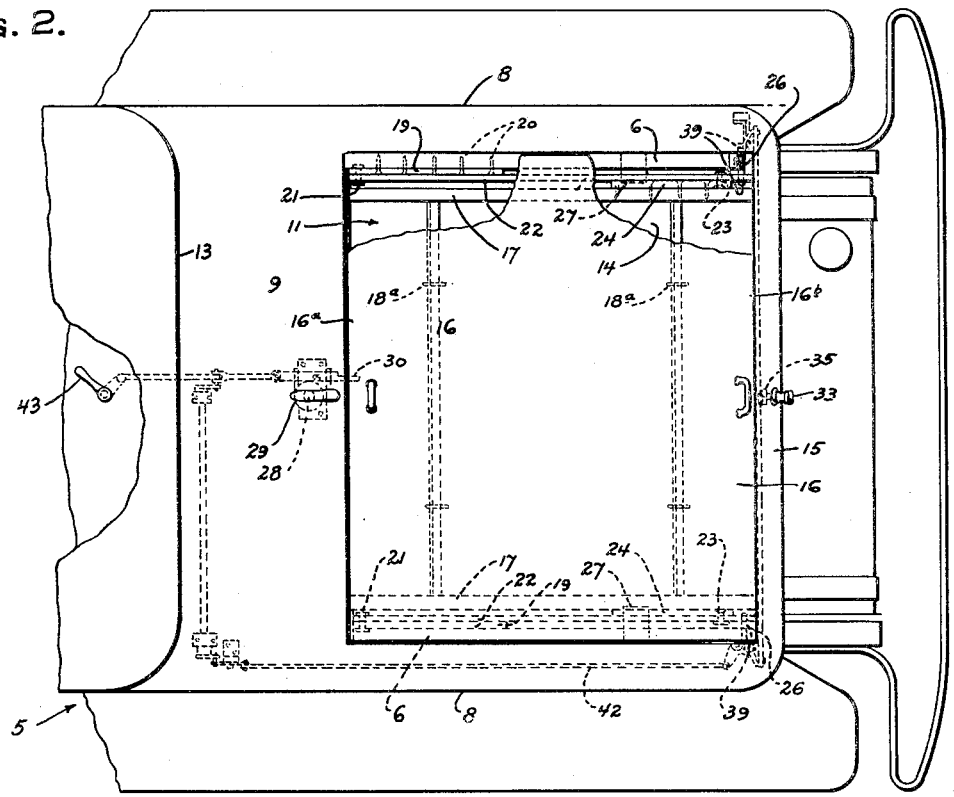
Fig. 2 is a plan view of structure of Fig. 1, partly broken away to show mechanism.

Referring to the drawings, wherein like characters of reference designate corresponding parts,— 5 is a chassis or frame of a motor driven vehicle, which has mounted thereon a frame generally indicated 6, about which is secured body walls comprising bottom 7, sides 8 and top or deck 9, which with a forward separator panel 10, and a rear wall 15, form a compartment 11 at the rear end of the frame of the vehicle. The deck 9 has a forward portion 12 which adjoins the rear of the driver's seat and extends transversely the width of the body. The driver's compartment may be of a closed or open type, the former known as a coupé or business body and the latter as a roadster type, both well known, the coupé type being shown in the drawings, and indicated generally 13. The deck 9 of the compartment 11 is provided with an opening 14 which preferably is substantially the width of the deck transverse the frame and extends from the rear end of the deck portion 12 to the upper end of the vertically disposed rear wall 15, said opening of the deck having a lid or cover 16, which overlies the opening and mounts on its inner side, and adjacent its side edges, braces or ribs 17 between which is mounted a lazyback or back cushion 18, which may be removable, as by pins and socket 18a of well known construction.

The cover 16 is arranged for pivotal hinge movement from either end of the opening 14, by any suitable hinge means, and in the illustrated preferred embodiment, the top portion of the frame 6 has mounted thereon, adjacent said opening 14, a wing or butt 19 fixedly secured to the frame by screws 20.

Hingedly connected at an end of the butt 19, as by ring bearing 21, is hinge strap 22, which may be termed an intermediate strap, the opposite end of which is hingedly connected, as by ring bearing 23 to a second butt 24, which, in turn, is fixedly attached, as by screws 25, to the rib 17. When the cover 16 normally rests upon the top 9 and overlying the opening 14, the intermediate strap and the butts pivoted at opposite ends thereof lie relatively parallel side by side, and between the rib 17 and the frame 6. Thus the cover may be raised selectively from either its forward end 16a or from its rearward end 16b, pivoting on the forward bearing 21, and carrying the intermediate strap 22 with it, if raised from the rear, or pivoting on the rearward bearing 23 if raised from its forward portion, in the latter movement the intermediate strap not being carried upward with the cover.

The structure is so arranged that when the cover is raised from its forward end 16a, its end 16b swings inward so as to be free of contact with the edge 15a of the vertical body portion 15, which arrangement is preferably accomplished by providing an offset or L 25, at the hinge joinder of strap 22 and butt 24, and positioning said joinder at a point spaced inwardly from the rear end 16b of the cover, as best shown in Fig. 1. A recess 26 is provided in the frame 6 through which the side edges of the cover adjacent its end 16b may pass. When thus hingedly raised on rear pivot 23, the cover is positioned substantially vertically with a slight rearward incline, with its end 16a upward. Any suitable means, such as a stop or lug 27, may be provided to prevent the downward movement of the intermediate strap member 22, and any suitable means may be adapted to furnish a check or support to sustain the cover 16 from further rearward inclination; in this embodiment being exemplified by the rear wall 26a of the recess 26 against which the lower portion of the cover rests when in its vertically rearwardly inclined position.

Locking means of suitable type are provided at each end of the cover for dual purposes. When the cover is resting on the frame in closed position, overlying and closing the opening 14, it is desirable to lock both ends of the compartment shut to prevent theft of contents. It is also desirable that each of the ends of the cover may be locked separately when the cover is raised from the opposite end, but the locking means must not interfere with the hinged action of butts 19 and 24 and strap 22.

Extending through the rear of portion 12 of the deck is a rotatable shaft 28 which is provided with a handle 29 above the deck and a latch 30 below the deck, said latch adapted to engage a staple 31 on the inner side of end 16a of the cover. Lock means are also provided at the opposite end 16b of the cover, comprising a handle 33, rotatable shaft 32, and a crank plate 35, to which is pivotally connected shafts 36 which extend to the opposite side portions of the frame and are adapted to reciprocate a latch bar 37 which is centrally pivoted at 34. The free end of the latch bars have latches 39 which releasably engage recesses 40 on the intermediate hinge strap 22. It will be noted that the latches 39 pass through frame 6 and therefore are adapted to engage the same recess in the intermediate strap whether the cover is in closed position or in rumble seat formation.

The shafts 28 and 32 each have lever arms extending therefrom, and jointed rod connection 42 extending from said lever arms to a handle member 43 within the driver's compartment of the vehicle. The rods and levers are so arranged that upon turning the handle member 43 in one direction, the lock at end 16a may be operated and upon turning the handle 43 in the other direction the lock at end 16b may be operated, so that either locking means may be operated independently from within the driver's compartment, as well as from the exterior of the rear compartment.

When the compartment 11 is used in connection with cover 16 for purposes of a rumble seat, a cushioned seat 44 of usual type is provided, which preferably has a frame 45 provided with a guide 46 which is slidable in a groove 47.

When the compartment 11 is used for a storage compartment, the seat 44 may be removed or it may be pushed forward in the compartment and under the deck portion 12 where it may be turned upon its forward face to prevent injury to the cushion.

Suitable and usual means may be used to maintain the cover in upraised position, when it is raised from either end, such as jointed braces 48 and 49.

It will also be observed that the structure herein is also adapted to accomplish the incidental purpose of increasing the storage capacity of the rear compartment when necessary to pack a large amount of material therein, such as on camping or hunting trips, which incidental result is accomplished by unlocking both ends and elevating both forward and rearward end of the cover. (See Fig. 6.)

In a modified form of structure illustrated in Fig. 3, the cover 16 is made of two parts and has at its rear end portion arms 50 offset from the cover, which arms have pivotal connections 51 with second arms 52 mounted to the body, so that when the cover 16 is raised from its forward end 16a the rearward end 16b is lowered into the compartment to provide a back support for a rumble seat.

Lying within the dimensions of the cover is a panel 16c, hinged as at 53 to the cover adjacent or in the region of the end portion 16a of the cover. This modified structure is in substance merely a widening of the straps 22 of Fig. 2, which correspond to the side strips 54 of cover 16 in the modified form of Fig. 3.

It is obvious that a transposition of parts may be made so that the main cover 16 is hinged at its forward end 16a and the panel 16c is hinged thereto at the rearward end portion 16b.

Figure 4:
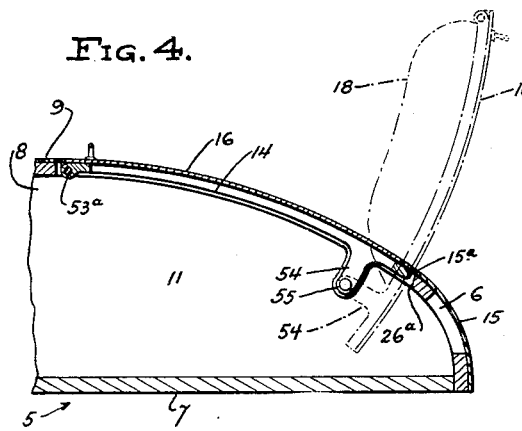
Figure 5:
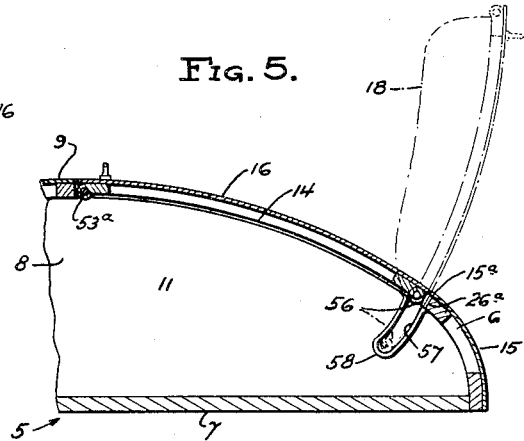

In the modifications of Figs. 4 and 5, the hinge strap and butts are eliminated and the cover 16 is pivoted at its forward end 16a on manually or mechanically removable pins 53a. In Fig. 4, the rear end of the cover has offset arms 54, which have pivoted bearing in sockets 55, which are mounted on frame 6 and extend downwardly in spaced relation to the upper portion of the frame 6 adjacent the side walls 8. In Fig. 5, rollers 56 are mounted at each side of the end 16b of the cover, and upon raising of the cover from the end 16a, the end 16b is carried by the rollers to the position shown by dotted lines in Fig. 5, by means of tracks 57 which have closed ends 58 in which the rollers seat.

Having thus described my invention what I claim and desire to secure by Letters Patent is:—

1. In a motor vehicle body, the combination of a deck having an opening therethrough, a cheek member extending along each side of said opening, a cover for said opening having a flange along each side thereof disposed opposite each of the cheeks of said opening, a link disposed edgewise between each of said cheeks and the adjacent flange upon the cover, means for pivotally connecting each of said links at their forward ends to the adjacent deck cheeks and at their rear ends to the adjacent flange on the cover, and a stop carried by said deck against which said link will abut to thereby hold the cover flush with the deck when closed.

2. In a motor vehicle body, the combination of a deck having an opening therethrough, a cover for said opening having an inwardly disposed flange along each side thereof, a link disposed edgewise between the sides of the opening in said deck and the adjacent flange upon the cover, means for pivotally connecting each of said links at their forward ends to the adjacent deck cheeks and at their rear ends to the adjacent flange on the cover, a stop carried by said deck against which said link will abut to thereby hold the cover flush with the deck when closed, and means for locking said link against movement when the cover is opened from its forward edge and when in its closed position.

3. In a vehicle body, a compartment forming portion having an opening in a deck thereof, a cover member adapted to normally close said opening, a double acting hinge member disposed edgewise between the cover and the sides of the deck opening, said cover being pivotally secured at one end to said double acting hinge member and the other end of said hinge being pivotally secured upon the body, whereby the cover and hinge member may be moved together in opening the cover from one end and said cover may be moved independently of said hinge member when opened from the opposite end of said opening, and a means for securing said hinge member against movement when said cover is opened independently thereof.

LINCOLN GORDON.